(No Model.)
M. G. MARSILLIOT.
CALF FEEDING APPARATUS.
No. 247,205. Patented Sept. 20, 1881.
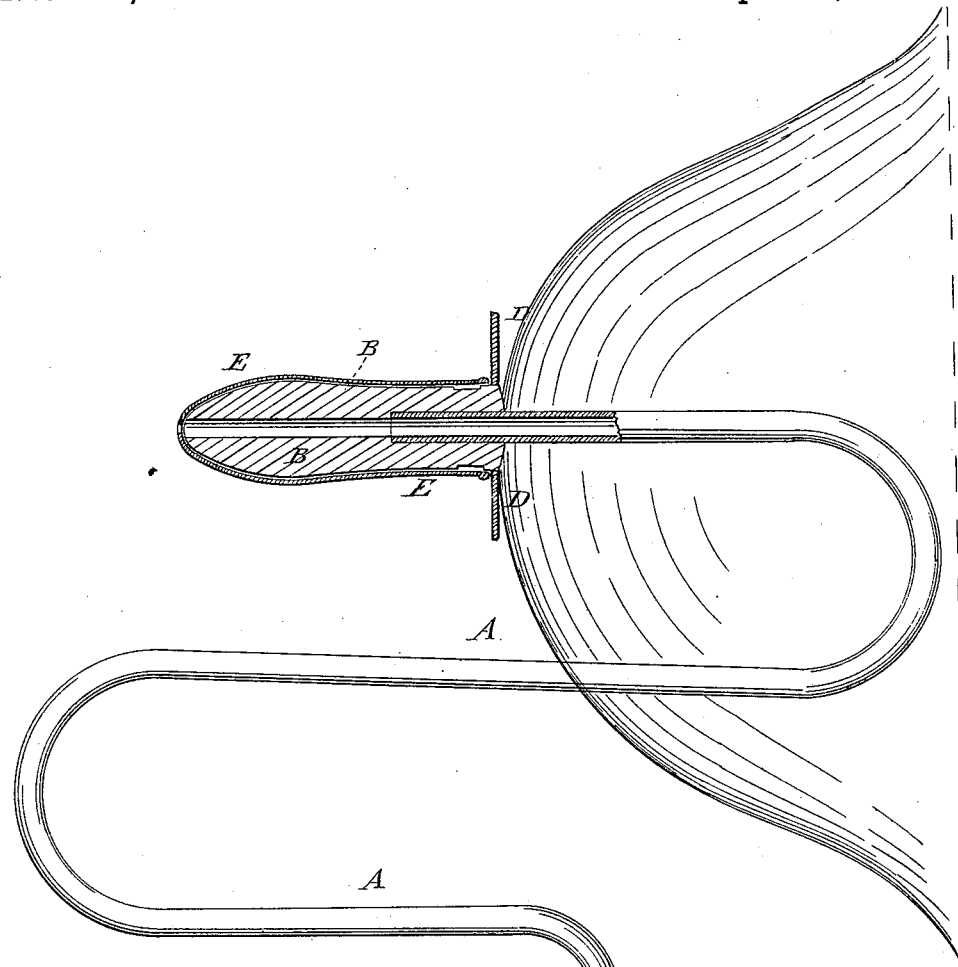
WITNESSES:
Chas. Nida.
C. Sedgwick
INVENTOR:
M. G. Marsilliot
BY Munn & Co.
ATTORNEYS.

UNITED STATES PATENT OFFICE.

MALCOLM G. MARSILLIOT, OF PORT TOWNSEND, WASHINGTON TERRITORY.

CALF-FEEDING APPARATUS.

SPECIFICATION forming part of Letters Patent No. 247,205, dated September 20, 1881.

Application filed October 21, 1880. (No model.)

*To all whom it may concern:*

Be it known that I, MALCOLM G. MARSILLIOT, of Port Townsend, in the county of Jefferson and Territory of Washington, have invented a new and Improved Calf-Feeding Apparatus, of which the following is a specification.

The drawing is a sectional elevation of the apparatus.

The object of this invention is to furnish an apparatus for feeding calves, the use of which will avoid the annoying labor of teaching them to drink, and which shall be simple in construction and convenient in use.

The invention consists in combining a rubber tube with a rear flanged wooden teat on one end and a strainer on the other, with an imitation udder, so that by putting the strainer end of the tube in a vessel containing milk the calf may suck in the usual and natural manner.

A represents a rubber tube of any convenient size and length. To one end of the tube A is attached a teat, B, of about the size and shape of a cow's teat, and which may be made of wood or other suitable material.

The wooden teat B is covered with rubber E, to prevent injury to the calf's mouth, and may have a bandage or other covering wrapped around it, to prevent the calf from sucking the teat down its throat; or the teat B may have a flange, D, upon its base, to prevent it from being drawn wholly into the calf's mouth. To the other end of the tube A is attached a perforated box or strainer, C, to prevent coarse sediment in the pail from being drawn into the tube A. The strainer C is made sufficiently heavy to keep it at the bottom of the pail.

In using the apparatus the pail containing the milk may be placed at outer side of the fence of the yard or pasture in which the calf may be, and the tube A passed through or over the fence and secured in such a position that the teat may be at the proper height for the calf to take it into its mouth while holding its head in a natural position.

The teat end of the tube A may be supported by a swing or stirrup attached to the fence, or to a post, or to a derrick-arm, as may be desired or convenient.

Connected with the tube A and the teat B is an artificial udder, made to correspond as nearly as possible to a cow's bag, formed of rubber or other suitable elastic material, and inflated with air or stuffed with any soft yielding substance, so that the calf can exercise its natural instinct of hunching or pushing with its nose without any danger of injury to the calf's nose and mouth when thrust forward.

Having thus described my invention, I claim as new and desire to secure by Letters Patent—

The combination of a rubber tube with a rear flanged wooden teat on one end of the tube, an imitation udder behind the teat, and a strainer, the latter arranged on the other end of tube and in the milk-receptacle, as shown and described.

MALCOLM GRAME MARSILLIOT.

Witnesses:
F. L. ROCKWOOD,
J. M. MACDOUGALL.